United States Patent
Pan

(10) Patent No.: US 12,223,043 B2
(45) Date of Patent: Feb. 11, 2025

(54) ELECTRONIC APPARATUS AND SECURITY PROTECTION METHOD

(71) Applicant: HUAWEI TECHNOLOGIES CO., LTD., GuangDong (CN)

(72) Inventor: Shilin Pan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 312 days.

(21) Appl. No.: 17/902,220

(22) Filed: Sep. 2, 2022

(65) Prior Publication Data
US 2022/0414216 A1 Dec. 29, 2022

Related U.S. Application Data

(63) Continuation of application No. PCT/CN2020/078092, filed on Mar. 6, 2020.

(51) Int. Cl.
*G06F 21/52* (2013.01)
*G06F 21/55* (2013.01)
*G06F 21/56* (2013.01)
*G06F 21/57* (2013.01)
*G06F 21/62* (2013.01)

(52) U.S. Cl.
CPC .............. *G06F 21/56* (2013.01); *G06F 21/52* (2013.01); *G06F 21/62* (2013.01)

(58) Field of Classification Search
CPC .......... G06F 21/56; G06F 21/52; G06F 21/62; G06F 21/55; G06F 21/57
See application file for complete search history.

(56) References Cited

U.S. PATENT DOCUMENTS

| | | | |
|---|---|---|---|
| 9,817,992 B1 | 11/2017 | Paczkowski et al. | |
| 2009/0217377 A1 | 8/2009 | Arbaugh et al. | |
| 2011/0078791 A1* | 3/2011 | Prakash | G06F 21/565 726/22 |
| 2014/0109170 A1* | 4/2014 | Nemiroff | G06F 21/78 726/1 |
| 2015/0113642 A1 | 4/2015 | Conti | |
| 2018/0288095 A1* | 10/2018 | Shaw | H04L 67/12 |

(Continued)

FOREIGN PATENT DOCUMENTS

| | | | | |
|---|---|---|---|---|
| CA | 2504336 A1 * | 10/2006 | ............ | G06F 13/126 |
| CA | 2829104 A1 * | 9/2012 | ............ | G06F 21/554 |

(Continued)

*Primary Examiner* — Jayesh M Jhaveri
(74) *Attorney, Agent, or Firm* — Rimon PC

(57) ABSTRACT

An electronic apparatus and a security protection method are disclosed. The electronic apparatus includes a security protection apparatus and a first processor. Security isolation exists between the security protection apparatus and the first processor. The first processor is configured to operate when driven by software, and the software includes an operating system and/or an application. The security protection apparatus is configured to: perform security detection on the software, and when detecting that the software is tampered with, perform a security protection operation on the electronic apparatus. In this way, the electronic apparatus may be monitored in real time during an operating process of the electronic apparatus, to avoid theft or modification of important data such as key data and improve security.

17 Claims, 8 Drawing Sheets

(56) References Cited

U.S. PATENT DOCUMENTS

2019/0318127 A1   10/2019  Pan
2019/0363894 A1*  11/2019  Kumar Ujjwal ...... H04L 9/3268
2021/0056207 A1*   2/2021  Tiwari ...................... G06F 8/65

FOREIGN PATENT DOCUMENTS

| | | | | |
|---|---|---|---|---|
| CA | 3048203 | C * | 9/2020 | ............. G06F 21/52 |
| CA | 3095222 | A1 * | 9/2020 | ............. F16P 3/142 |
| CN | 106909835 | A | 6/2017 | |
| CN | 107194284 | A | 9/2017 | |
| CN | 109522754 | A | 3/2019 | |
| CN | 106603487 | B * | 5/2020 | ......... H04L 63/0428 |
| JP | 4746233 | B2 * | 8/2011 | ............. G06F 21/57 |
| WO | 2019072158 | A1 | 4/2019 | |

* cited by examiner

ELECTRONIC APPARATUS AND SECURITY PROTECTION METHOD

CROSS-REFERENCE TO RELATED APPLICATION

This application is a continuation of International Application No. PCT/CN2020/078092, filed on Mar. 6, 2020, which is hereby incorporated by reference in its entirety.

TECHNICAL FIELD

Embodiments of this application relate generally to the field of system security technologies, and in particular, to an electronic apparatus and a security protection method.

BACKGROUND

With rapid development of internet technologies and smart terminals, an increasing quantity of applications operate on a smart terminal. The applications usually relate to various fields, such as an electronic payment application, a biometric recognition application, and an instant messaging application. Because most of the applications are consumer-related, an increasingly high requirement is imposed on the security of the operating environment of the smart terminal.

To ensure security of the operating environment of the smart terminal, in a conventional technology, execution environments of the smart terminal are generally divided into independent execution environments: a rich execution environment (REE) and a trusted execution environment (TEE). A general operating system (for example, an Android™ system) usually operates in an REE and an operating system with a high security level usually operates in a TEE. A client application (CA) with a low security requirement often operates in an REE, and a trusted application (TA) with a high security requirement usually operates in a TEE, and provides a security service for a CA deployed in a general operating system. The security service provided by a TEE usually controls a CA's access in the REE by setting access permission.

In a related technology, an REE and a TEE are usually supported by common hardware. In other words, when an REE operates, the counterpart TEE cannot operate, and consequently the operating status of the REE cannot be monitored. When the operating REE is attacked and the access permission is granted to the intruder, the TEE usually cannot detect the attack. As such, the CA operating in the REE only optionally or selectively invokes the security service provided by the TEE. When there is such a TEE vulnerability, important data such as biometric recognition data (fingerprint data and face image data) and keys may be compromised, threatening consumer interests. Therefore, how to perform security protection during REE/TEE operation or perform security protection in an entire working system becomes a problem that needs to be resolved.

SUMMARY

This application provides an electronic apparatus that is monitored in real time using a security protection apparatus during an operating process of the electronic apparatus, to improve security of the electronic apparatus.

To achieve the foregoing objective, this application uses the following technical solutions.

According to a first aspect, an embodiment of this application provides an electronic apparatus. The electronic apparatus includes a security protection apparatus and a first processor. Security isolation exists between the security protection apparatus and the first processor. The first processor is configured to operate when driven by software, and the software includes an operating system and/or an application. The security protection apparatus is configured to: perform security detection on the software, and when detecting that the software is tampered with, perform a security protection operation on the electronic apparatus. The security protection apparatus may be configured to perform: when the electronic apparatus is powered on, when the electronic apparatus is woken up, or when the first processor operates, security detection on the software operating on the first processor, so that the electronic apparatus may be protected during power-on and operating, to reduce a risk of security data such as key data and face image data being stolen or modified, and improve security performance of the electronic apparatus.

In a possible design, the security isolation in this application includes at least one selected from the following: working system isolation, power supply isolation, or clock signal isolation.

Working system isolation between the security protection apparatus and the first processor can prevent a hacker from accessing or tampering with an operating program of the security protection apparatus or data generated in an operating process of the program, by changing an operating program loaded in a memory of the first processor to improve security of the security protection apparatus. Power supply isolation between the security protection apparatus and the first processor can prevent the security protection apparatus from being maliciously powered off when the first processor is attacked. The security protection apparatus is powered off only when all electronic apparatuses are powered off (for example, a terminal device is powered off). Clock signal isolation between the security protection apparatus and the first processor can prevent a clock cycle of the security protection apparatus from being maliciously tampered with when the first processor is attacked. Therefore, when the first processor operates, the security protection apparatus may monitor an operating system, an application, and data of the first processor in real time or periodically, thereby ensuring security of the electronic apparatus and further ensuring data security.

In a possible design, the security protection operation in this application includes at least one of the following: triggering an alarm, resetting the electronic apparatus, rejecting a service requested by the software, instructing the first processor to stop operating, instructing the first processor to stop operating the software, disabling at least a part of functions of the software, or preventing the software from accessing data stored in the electronic apparatus.

In a possible design, the security detection in this application includes: detecting whether at least one of an instruction or data of the software is or includes preset information.

The preset information herein may include a pre-stored instruction or data of the software, or may include a hash reference value obtained by performing hash calculation on the instruction or data of the software.

In a possible design, the first processor includes an on-chip tracking unit. The on-chip tracking unit is configured to: when the first processor rewrites data, store an instruction sequence used for data rewriting in a dedicated memory.

In a possible design, the security detection includes detecting whether the instruction sequence stored in the dedicated memory is a reference instruction sequence.

Generally, the data in the software includes variable data and invariable data. A change of the variable data is generally triggered based on an instruction during a process of executing the instruction sequence. Because the instruction sequence is usually generated by the electronic apparatus through compilation based on a program compiled by a developer, the instruction sequence usually does not change. When the electronic apparatus detects a change of the data in the software or receives an interrupt, sent by the first processor, for rewriting data, the electronic apparatus may determine whether the instruction sequence stored in the dedicated memory is the reference instruction sequence. When it is determined that the instruction sequence stored in the dedicated memory is not the reference instruction sequence, it is considered that the data is tampered with.

In a possible design, the electronic apparatus includes a memory. The memory is configured to store the instruction and data of the software. The dedicated memory is a storage space that is disposed in the memory and that is used by the on-chip tracking unit and the security protection apparatus to perform reading and writing.

In a possible design, the security protection apparatus includes a second processor. The second processor is configured to: perform periodic security detection on the software based on a time period set by a timer, or perform security detection on the software based on an interrupt event sent by the first processor.

In a possible design, the security protection apparatus further includes a hash accelerator. The hash accelerator is coupled to the second processor. When performing the security detection on the software, the second processor is configured to: control the hash accelerator to obtain the software and perform a hash operation on the obtained software to obtain a reference value; and compare the reference value with a pre-stored hash reference value, and determine, based on a comparison result, whether the software is tampered with.

In a possible design, the security protection apparatus further includes a watchdog. The electronic apparatus further includes a reset unit. The watchdog is coupled to the second processor and the reset unit. The second processor is further configured to periodically send a heartbeat instruction to the watchdog. The watchdog is configured to: when the heartbeat instruction sent by the second processor is not received within a predetermined time period, reset the electronic apparatus by using the reset unit.

The watchdog may be disposed to prevent another processor from being attacked in an operating process when the security protection apparatus stops responding.

In a possible design, the operating system includes a rich execution environment (REE) and a trusted execution environment (TEE).

In a possible design, the security protection apparatus is configured to: when an operating environment of the first processor is switched from an REE to a TEE, periodically perform the security detection on software that is used to drive the operating environment of the first processor to be switched and software that operates in the TEE; and stop performing the security detection when the operating environment of the first processor is switched from the TEE to the REE.

According to a second aspect, an embodiment of this application provides a security protection method, applied to an electronic apparatus. The security protection method includes: A first processor in the electronic apparatus operates when driven by software. The software includes an operating system and/or an application. A security protection apparatus in the electronic apparatus performs security detection on the software. Security isolation exists between the security protection apparatus and the first processor. When detecting that the software is tampered with, the security protection apparatus performs a security protection operation on the electronic apparatus.

BRIEF DESCRIPTION OF DRAWINGS

To describe the technical solutions in embodiments of this application more clearly, the following briefly introduces the accompanying drawings for describing embodiments of this application. It is clear that the accompanying drawings in the following description show merely some embodiments of this application, and persons of ordinary skill in the art may still derive other drawings from these accompanying drawings without creative efforts.

DESCRIPTION OF EMBODIMENTS

The following clearly describes the technical solutions in embodiments of this application with reference to the accompanying drawings in embodiments of this application. It is clear that the described embodiments are some but not all of embodiments of this application. All other embodiments obtained by persons of ordinary skill in the art based on embodiments of this application without creative efforts shall fall within the protection scope of this application.

"First", "second", or the like mentioned in this specification does not indicate any order, quantity, or importance, but is used only for distinguishing between different components. Likewise, "a/an", "one", or the like is not intended to indicate a quantity limitation either, but is intended to indicate at least one. "Connection", "link" or the like is not limited to a physical or mechanical connection, but may include an electrical connection, whether directly or indirectly. It is equivalent to coupling or a connection in a broad sense.

In addition, in embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example" or "for example" or the like is intended to present a relative concept in a specific manner. In the descriptions of embodiments of this application, unless otherwise stated, "a plurality of" means two or more than two. For example, a plurality of processing units mean two or more processing units.

To make the objectives, technical solutions, and advantages of this application clearer, the following clearly and completely describes the technical solutions in this application with reference to the accompanying drawings in this application. Obviously, the described embodiments are some but not all of embodiments of this application. All other embodiments obtained by persons of ordinary skill in the art based on embodiments of this application without creative efforts shall fall within the protection scope of this application.

Figure 1:
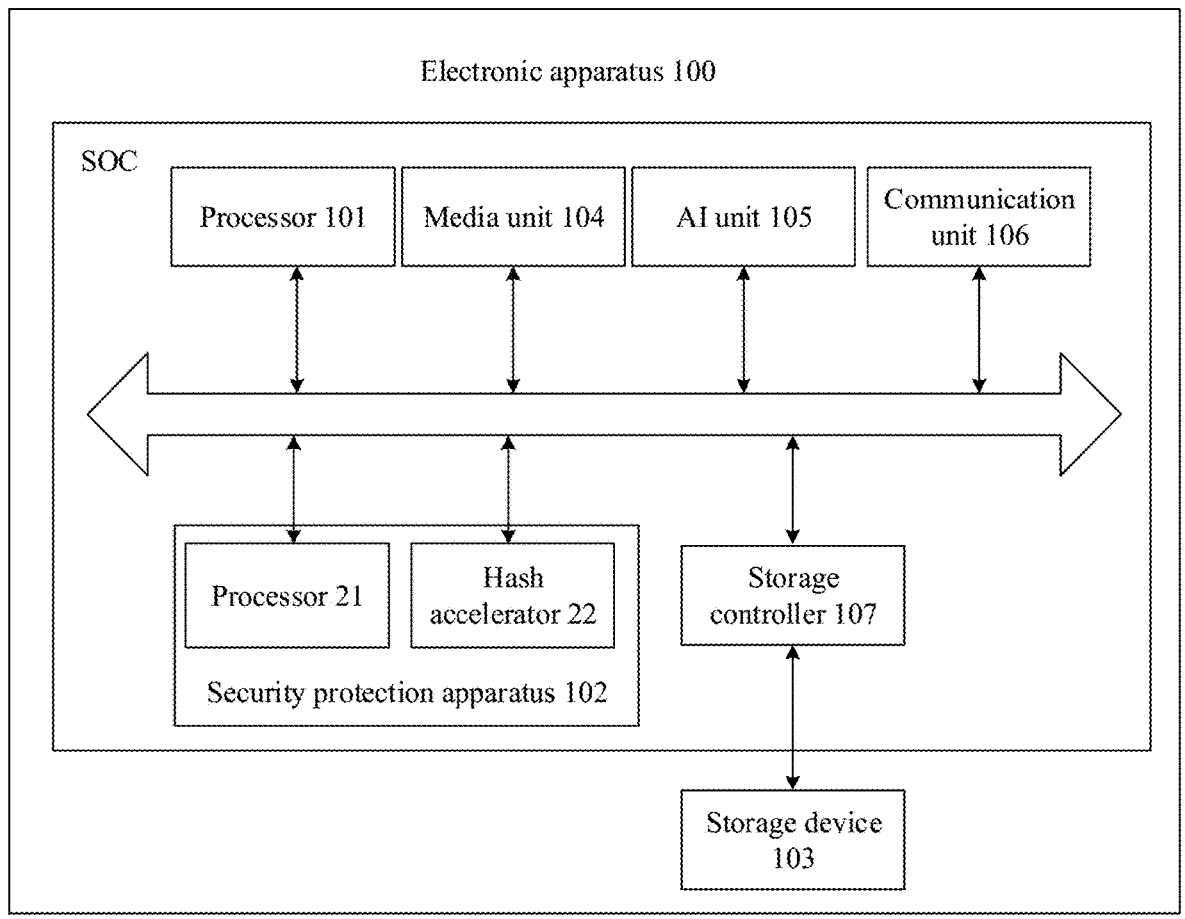
FIG. 1 is a schematic diagram of a structure of an electronic apparatus according to an embodiment of this application.

FIG. 1 is a schematic diagram of a hardware architecture of an electronic apparatus according to an embodiment of this application. The electronic apparatus 100 may be located in a terminal. The terminal may be user equipment (UE), for example, various types of portable terminal devices such as a mobile phone, a tablet computer, or a wearable device (such as a smartwatch). The electronic apparatus 100 may be a chip or a chipset, or a circuit board with a chip or a chipset. The chip, the chipset, or the circuit board with the chip or the chipset may work when driven by necessary software.

Figure 2:
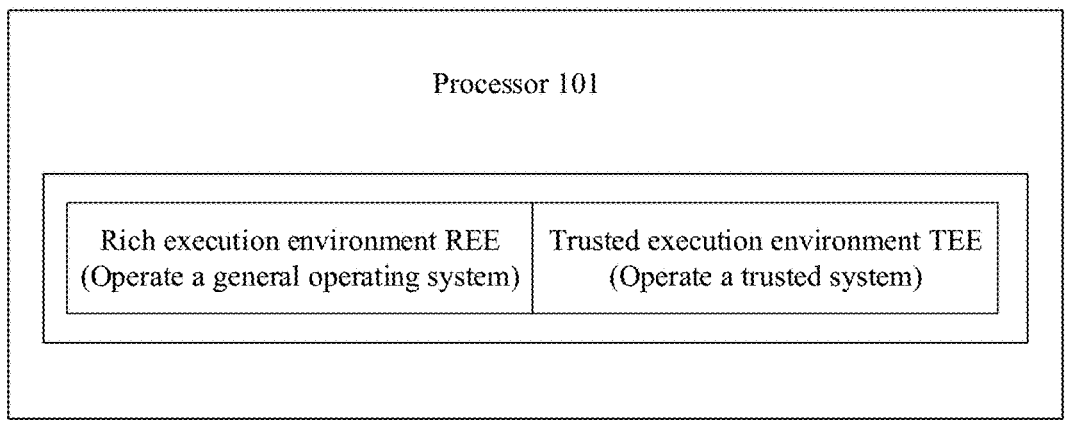
FIG. 2 is a schematic diagram of a structure of a processor 101 in the electronic apparatus shown in FIG. 1 according to an embodiment of this application.

The electronic apparatus 100 shown in FIG. 1 includes a processor 101. The processor 101 includes at least one central processing unit. Generally, rich execution environment (REE) software and trusted execution environment (TEE) software may operate on the processor 101, as shown in FIG. 2. The REE software or the TEE software includes but is not limited to operating system software, compilation software, application software, or the like. The software herein may include but is not limited to an instruction and data. Specifically, an operating system software based on a rich execution environment (REE) may also be referred to as general operating system software. A general operating system is, for example, an Android operating system, a Windows operating system, or an iOS operating system. These operating systems may be used to support common non-security application software. Some of the common non-security application software may invoke security application software (trusted application (TA)) in a trusted execution environment (TEE), and this type of software may also be referred to as a CA (common application). A CA is usually a third-party application (for example, a video application or a shopping application). Operating system software based on the trusted execution environment (TEE) may also be referred to as trusted application system software. A trusted application system is used to support security application software. The security application software may also be referred to as a TA, for example, an application that performs a security service such as signature, encryption/decryption calculation, or face comparison. TEE software has higher security than REE software. Therefore, TA has a higher security level than the CA. A TEE is strictly restricted and usually is not accessed by a common CA. Therefore, security isolation exists between the TEE software and the REE software, to ensure security of the TA software and the CA software.

The electronic apparatus 100 shown in FIG. 1 further includes a security protection apparatus 102. The security protection apparatus 102 includes a processor 21. The processor 21 is configured to operate security system software. The security system software herein may include but is not limited to a system or an application. The system or the application separately includes an instruction and data that are required in an operating process. The processor 21 may perform, driven by the security system software, when the electronic apparatus 100 is powered on, when the electronic apparatus 100 is woken up, or when the processor 101 operates, security detection on software operating on the processor 101, to ensure that the software operating on the processor 101 is normal. For example, security detection is performed on an instruction loaded by the processor 101, data obtained by the processor 101, and the like, to ensure that an instruction loaded by the processor 21, data obtained by the processor 21, and the like are not rewritten or are normally rewritten, that is, to prevent related data from being tampered with. The normal rewriting herein means that rewriting of some variable information in the electronic apparatus 100 is performed by the processor based on a preset program invoking path. When detecting that the software operating on the processor 101 is tampered with, the processor 21 may perform a security protection operation on the electronic apparatus. The security protection operation herein may include but is not limited to: triggering an alarm, resetting the electronic apparatus 100, rejecting a service requested by the software (for example, a biometric recognition service, a password unlocking service, or a key obtaining service), instructing the processor 101 to stop operating, instructing the processor 101 to stop operating the software, disabling at least a part of functions of the software operating on the processor 101, or preventing the software from accessing data stored in the electronic apparatus 100.

In addition, when ensuring that the software operating on the processor 101 is normal, the processor 21 may further communicate with the processor 101 through a bus. The communication includes but is not limited to: sending, by the processor 101, an interrupt request to the processor 21 based on the operating CA or TA. The processor 21 may obtain, based on the interrupt request of the processor 101, the instruction and data of the CA or TA that are loaded by the processor 101, and perform security detection on the instruction and data of the CA or TA, to ensure secure operating of the CA or TA and prevent the CA or TA from being attacked. For example, in a scenario of this embodiment, in response to an unlock instruction sent by a user, the processor 101 sends to the processor 21 interrupt information indicating to the processor 21 to execute an unlock event, and then the processor 101 continues to execute the unlock event. The processor 21 responds to the interrupt, and during the process in which the processor 101 executes the unlock event, performs security protection on an instruction of the CA operating on the processor 101, an instruction of the TA operating on the processor 101, data obtained or generated when the processor 101 operates, and the like, to prevent key data, fingerprint data, and/or face image data related to face ID unlock from being tampered with or stolen. It should be noted herein that the processor 21 does not change operating logic of the processor 101 in a process of performing the security protection.

In some embodiments, security isolation exists between the security protection apparatus 102 and the processor 101. In other words, a hardware design of the security protection apparatus 102 ensures that the software operating on the processor 101 cannot interfere with operating of the security protection apparatus 102. Specifically, the security isolation herein may include but is not limited to: working system isolation, power supply isolation, or clock signal isolation. Working system isolation may refer to the scenario that the processor 101 cannot access the security protection apparatus 102 by using the operating software. Herein, that the processor 101 cannot access the security protection apparatus 102 means that the processor 101 cannot access an operating program (including an instruction and data) of the processor 21, data obtained or generated when the processor 21 operates, or the like. Power supply isolation may refer to the scenario that the processor 101 cannot control power-on or power-off of one or more components (for example, the processor 21) in the security protection apparatus 102. To be specific, each component (for example, the processor 21) in the security protection apparatus 102 may be directly powered by an external power supply (for example, a battery or a power adapter), and the processor 101 cannot control each component in the security protection apparatus 102 to start, shut down, enter or exit a low power consumption state, or the like. When the electronic apparatus 100 is powered by the external power supply, both the processor 101 and the processor 21 are separately started, or the processor 21 may be first started. When the electronic apparatus 100 is powered off, both the processor 101 and the processor 21 are separately shut down. Clock signal isolation means that the processor 101 cannot control a clock cycle of one or more components (for example, the processor 21) in the security protection apparatus 102. To be specific, the clock cycle of each component (for example, the processor 21) in the security protection apparatus 102 during working may be directly provided by an external clock signal source, and the processor 101 cannot change the clock cycle of each component in the security protection apparatus 102.

Working system isolation between the security protection apparatus 102 and at least one processor 101 can prevent a hacker from accessing or tampering with an operating program of the processor 21 or data generated in an operating process of the program, by changing an operating program loaded in a memory of the processor 101, to improve security of the security protection apparatus. Power supply isolation between the security protection apparatus 102 and at least one processor 101 can prevent the security protection apparatus 102 from being maliciously powered off when the processor 101 is attacked. The security protection apparatus 102 is powered off only when all electronic apparatuses 100 are powered off (for example, a terminal device is powered off). Clock signal isolation between the security protection apparatus 102 and at least one processor 101 can prevent the clock cycle of the security protection apparatus 102 from being maliciously tampered with when the processor 101 is attacked. Therefore, when the processor 101 operates, the security protection apparatus 102 may monitor an operating system of the processor 101, an application operating on the processor 101, and data in real time or periodically, thereby ensuring security of the electronic apparatus 100 and further ensuring data security.

In some embodiments, as shown in FIG. 1, the electronic apparatus 100 further includes a storage device 103. The storage device 103 is a memory of the electronic apparatus 100, and may include but is not limited to a random access memory (RAM) and a read-only memory (ROM).

The storage device 103 may store an instruction and data. The processor 101 or the processor 21 performs various function applications and data processing of the electronic device by loading an instruction and obtaining data. Specifically, the read-only memory may store startup key data that needs to be loaded when the processor 101 or the processor 21 is started. The random access memory may store instruction code such as an operating system or an application that needs to operate on the processor 101 or the processor 21, and data required for operating, and may further include various intermediate operation results, data, configuration data, or the like generated by operating a process. The random access memory may include a volatile memory (such as an SRAM, a DRAM, or an SDRAM) and a non-volatile memory.

The storage space that is in the storage device 103 and that stores operating software of the REE is a first storage space. The storage space that is in the storage device 103 and that stores operating software of the TEE is a second storage space. The storage space that is in the storage device 103 and that stores operating software of the processor 21 is a third storage space. The first storage space, the second storage space, and the third storage space correspond to corresponding physical addresses in various memories. Therefore, during operating, each system accesses a corresponding memory based on a physical address of each memory, to obtain operating software such as instruction code or data. It should be noted herein that, during operating of the REE, the processor 101 may access only the operating software stored in the first storage space; during operating of the TEE, the processor 101 may access the operating software stored in the first storage space and the operating software stored in the second storage space; and the processor 21 may access, driven by a security system operating on the processor 21, the operating software stored in the first storage space, in the second storage space, and in the third storage space. Therefore, when the electronic apparatus 100 is powered on, when the system 100 is woken up, or when the processor 101 operates, the processor 21 may determine, by accessing the operating software stored in the first storage space and the operating software stored in the second storage space, whether operating software such as instruction code or data of the REE and the TEE is tampered with, to protect an operating environment of the processor 101. It should be noted that, in some embodiments, the limitation on the storage space that can be accessed by each processor during operating may be implemented by using a hardware design, which is a current general technology. Details are not described herein again.

Optionally, a shared memory is further disposed in the storage device 103. When sending the interrupt request to the processor 21 based on the operating CA or TA, the processor 101 may write, into the shared memory, indication information indicating an event to be executed by the processor 101. After receiving the interrupt request, the processor 21 may obtain the indication information from the shared memory, and perform, based on the indication information, security detection on a CA instruction, a TA instruction, and related data (for example, configuration information) that are used to operate the event, to ensure secure operating of the CA or the TA. In some implementations, after acquiring the indication information from the shared memory, the processor 21 may further clear the shared memory, so that the processor 101 continues to write indication information into the shared memory.

In some embodiments, the processor 101 may control the storage device 103 based on the software operating on the processor 101. The specific control may include but is not limited to: controlling starting, controlling shut-down, and controlling entering or exiting the low power consumption state. The processor 21 may also control the storage device 103 based on software operating on the processor 21. The specific control may include but is not limited to: controlling shut-down, controlling resetting, or the like. Generally, the processor 101 controls the storage device 103 to start, shut down, enter, or exit the low power consumption state. When detecting that an instruction or data for operating the processor 101 is abnormal, the processor 21 may control the storage device 103 to shut down or reset. Therefore, loss of important data caused by an attack on the electronic apparatus 100 may be avoided.

In some embodiments, the electronic apparatus 100 may include various types of registers. The registers include but are not limited to: an address register configured to store an instruction address, a reset register configured to store a reset instruction of an electronic apparatus, a data register configured to store data required in an operating process, or an instruction register configured to store an instruction that needs to be executed. In addition, a configuration register configured to store system configuration information may be further included. For example, the configuration register may store resource configuration information based on a TrustZone in the processor 101. For example, the resource configuration information may be used to configure which memories in the storage device may be accessed when the processor 101 operates in an REE and which memories may be accessed only when the processor 101 operates in a TEE.

The processor 21 shown in this embodiment may access some or all registers in the electronic apparatus 100, and may further rewrite instructions in some or all registers. Specifically, the processor 21 may access the register in the electronic apparatus 100 when the electronic apparatus 100 is powered on, when the system 100 is woken up, or when the processor 101 operates, to determine whether information (for example, configuration information in a configuration information register) stored in the register is changed. Generally, data stored in some registers dynamically changes, and these registers may also be referred to as dynamic registers. For example, the resource configuration information stored in the configuration register may be different in different processes. In a same process, the resource configuration information may also be different as an instruction is executed. A change of data in the dynamic register is generally triggered by an instruction during a process of executing an instruction sequence. Because the instruction sequence is usually generated by the electronic apparatus 100 through compilation based on a program compiled by a developer, the instruction sequence usually does not change. However, an instruction sequence written by the hacker when rewriting the data in the dynamic register is usually different from a reference instruction sequence. Therefore, further, after detecting a change of data in the dynamic register, the processor 21 may determine whether the instruction sequence for operating the processor 101 is the reference instruction sequence. When the sequence is the reference instruction sequence, it determines that the change of data in the dynamic register is normal. In this case, the processor 21 may change a reference sequence of the dynamic register. When the instruction sequence for operating the processor 101 is not the reference instruction sequence, it is considered that the dynamic register has been or is being tampered with, and a reset instruction may be written into the reset register in the processor 101, to reset the electronic apparatus 100.

In addition, when the processor 101 operates, important configuration data may also be dynamically changed. The important configuration data is generally stored in the DRAM, for example, may include but is not limited to: page table entry data, process PID/UID information, or important system security permission configuration data. When the processor 21 detects a change of important configuration data, the foregoing method of comparing reference instruction sequences may also be used to verify whether the change is a normal change, and details are not described herein again.

Figure 4:
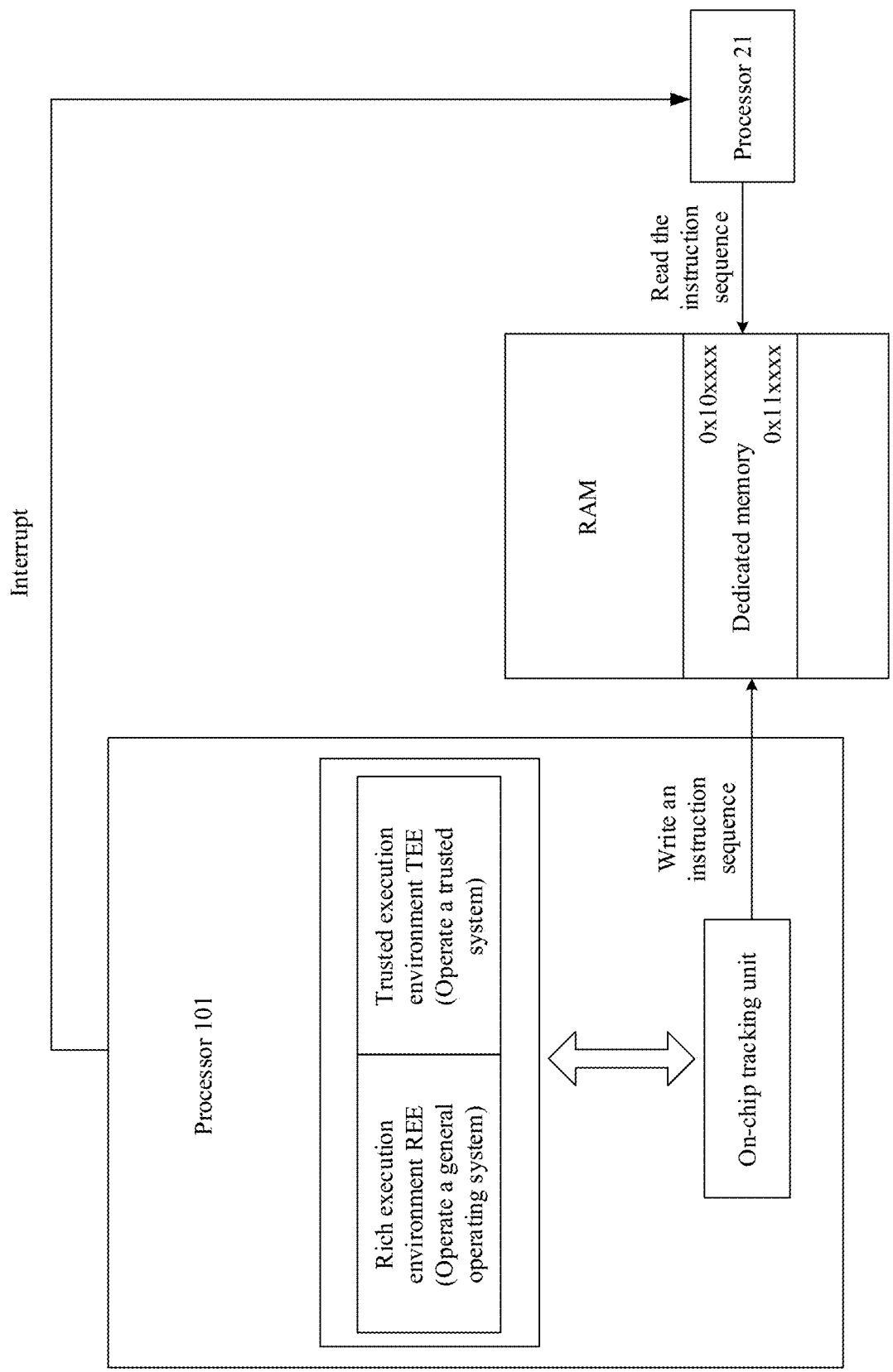
FIG. 4 is a schematic diagram of interaction between components in an electronic apparatus according to an embodiment of this application.

Optionally, the electronic apparatus 100 further includes an on-chip tracking unit, as shown in FIG. 4. The on-chip tracking unit may be a coresight system, is usually installed inside the processor 101 and coupled to a core of the processor 101, and is configured to obtain an instruction sequence of the processor 101 during an operating process of the processor 101.

Optionally, a dedicated memory is further disposed in the storage device 103, as shown in FIG. 4. The dedicated memory may be disposed in the RAM in the storage device 103, and is used as storage space for reading data and writing data by the on-chip tracking unit and the security protection apparatus 102 (for example, the processor 21 or a hash accelerator 22 in the security protection apparatus 102). FIG. 4 schematically shows that a physical address of the dedicated memory in the storage device 103 is (0x10xxxx, 0x11xxxx), and the physical address of the dedicated memory is also schematically set based on a requirement of a scenario.

In FIG. 4, when rewriting data in the dynamic register based on an instruction, the processor 101 may invoke a coresight system to obtain the instruction sequence of the processor 101, and the coresight system may store the obtained instruction sequence in the dedicated memory. After the coresight system stores the instruction sequence in the dedicated memory, the processor 101 may send, to the processor 21, an interrupt indicating an event of data rewriting. After receiving the interrupt indicating an event of data rewriting sent by the processor 101 or when detecting the change of the data in the dynamic register, the processor 21 may obtain the instruction sequence stored in the dedicated memory, and check the instruction sequence. When it is determined that the instruction sequence is the reference instruction sequence, it may be determined that rewriting of the data in the dynamic register is normal rewriting. When it is determined that the instruction sequence is not the reference instruction sequence or the dedicated memory does not store the instruction sequence, it may be determined that the data in the dynamic register is being or has been tampered with. In this case, the reset instruction may be written into the system reset register. The coresight system is an on-chip tracking and debugging system in the conventional technology, and details are not described herein. In addition, after obtaining the instruction sequence from the dedicated memory, the processor 101 may further clear the dedicated memory, so that when the dynamic register is rewritten next time, the coresight system continues to write the instruction sequence into the dedicated memory.

In some embodiments, the electronic apparatus 100 may store preset information of an instruction and data of the software operating on the processor 101. The preset information may be an original instruction and original data, or may be a hash reference value obtained by performing a HASH operation on an original instruction, original data, or the like. After obtaining instruction code or data from the storage device 103 or obtaining instruction code or data from the register, the processor 101 may compare the instruction code or data with the preset information to determine whether the software operating on the processor 101 is tampered with.

Specifically, when the preset information is the hash reference value obtained by performing the HASH operation, the HASH operation may be further performed on the obtained instruction code, data, or the like. In this way, a HASH value of an instruction code or data is obtained. The processor 21 may compare the HASH value obtained through calculation with a corresponding hash reference value, to determine whether an instruction, data, or the like has been tampered with. Further, the reference instruction sequence may also be a reference value obtained by performing a HASH operation. After obtaining the instruction sequence, the processor 21 may also perform a HASH operation on the instruction sequence, and then compare a HASH value obtained through calculation with the reference value, to determine whether the instruction sequence is tampered with.

Figure 3:
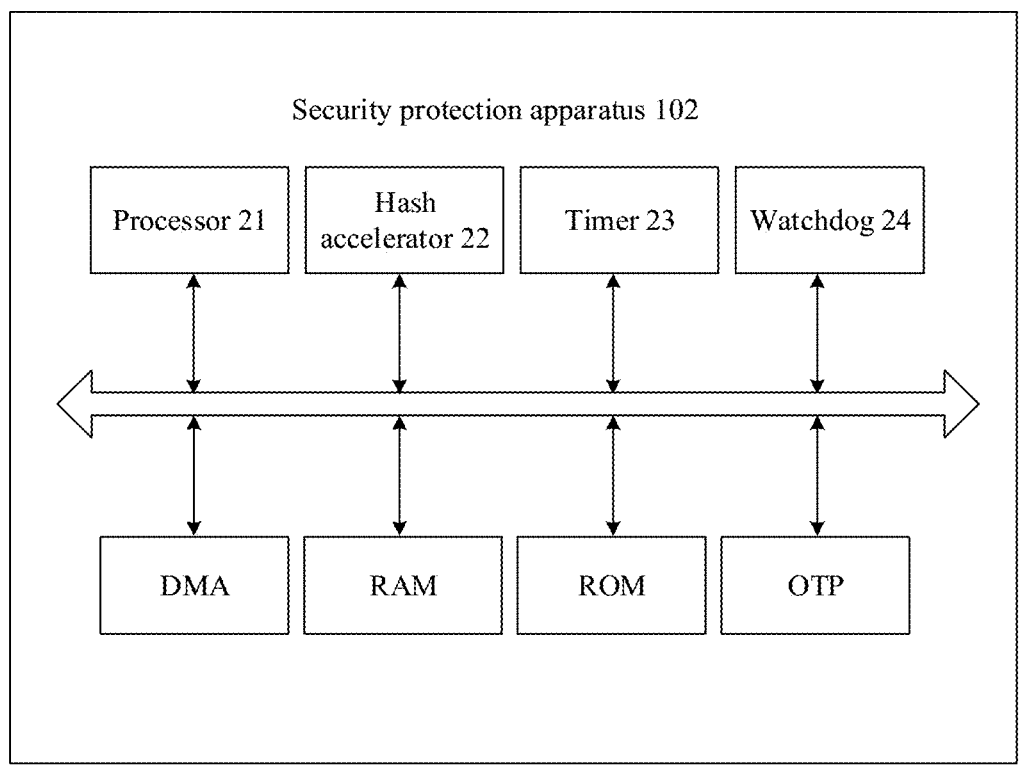
FIG. 3 is a schematic diagram of a structure of a security protection apparatus according to an embodiment of this application.

Optionally, the HASH operation performed on the instruction or data is implemented using an arithmetic logic unit. Specifically, the security protection apparatus 102 further includes a hash accelerator 22, as shown in FIG. 3. The hash accelerator 22 is coupled to the processor 21. The processor 21 controls, driven by the operating software, the hash accelerator 22 to obtain a to-be-detected instruction, to-be-detected data, or a to-be-detected instruction sequence from the storage device 103. Then, the hash accelerator 22 performs a HASH operation on the to-be-detected data, the to-be-detected instruction, or the to-be-detected instruction sequence, so that the processor 21 determines, based on a hash reference value and a HASH value of the to-be-detected data, the to-be-detected instruction, or the to-be-detected instruction sequence, whether the to-be-detected data, the to-be-detected instruction, or the to-be-detected instruction sequence has been altered. The hash accelerator 22 and the processor 21 may be coupled in a same processor or separate processors. The hash accelerator 22 herein may be, for example, an SHA256 algorithm device. The hash accelerator 22 may be a Hash Accelerator IP or a crypto engine hash.

In some embodiments, the security protection apparatus 102 further includes a timer 23, as shown in FIG. 3. The timer 23 is coupled to the processor 21. Under control of the processor 21, the timer 23 sets a timing duration based on a clock cycle provided by a clock source. Optionally, a watchdog 24 is further disposed in the security protection apparatus 102, as shown in FIG. 3. The watchdog 24 may be connected to a hardware reset unit in the electronic apparatus 100. When the security protection apparatus 102 stops working on its own or due to a self-related reason, the software operating on another processor in the electronic apparatus 100 continues to operate, in which case monitoring cannot be performed. The watchdog 24 may be disposed to prevent another processor from being attacked in an operating process when the security protection apparatus 102 stops responding. When the security protection apparatus 102 normally operates, the processor 21 may periodically send a heartbeat instruction to the watchdog 24. When the watchdog 24 does not receive, within a predetermined time period set by the timer 23, the heartbeat instruction sent by the processor 101, the watchdog 24 may reset the electronic apparatus 100 by using the hardware reset unit in the electronic apparatus 100.

Optionally, the security protection apparatus 102 further includes a random access memory (RAM). The RAM herein may be an SRAM. The RAM is coupled to the processor 21, and is configured to store an instruction that drives the processor 21 to operate. Generally, after powering on, the processor 21 first accesses the third storage space in the storage device 103, and loads and operates an executable program stored in the storage device 103. When the storage device 103 cannot access the processor 101 due to an exception, the exception may be caused by an external attack on the electronic apparatus 100. To prevent the electronic apparatus 100 from continuously suffering from an external attack, the processor 21 accesses the RAM in this case and operates the instruction stored in the RAM. The instruction stored in the RAM instructs the processor 21 to perform a reset operation on the electronic apparatus 100.

Optionally, the security protection apparatus 102 further includes a read-only memory (ROM) and a one-time programmable (OTP) memory. The OTP may be an Efuse memory. The ROM stores startup program code of the security protection apparatus 102. After the processor 21 is powered on, the startup program code may be loaded from the ROM, so that the security protection apparatus 102 is started. An Efuse can store startup key data. After loading a startup program, the processor 21 may further obtain the startup key data from the Efuse and use the startup key data to check the startup program, so that the security protection apparatus 10 is securely started.

In a possible implementation, the security protection apparatus 102 and the at least one processor 101 are integrated into a first semiconductor chip in the electronic apparatus 100, to form a system on chip (SOC), as shown in FIG. 1. In addition, a power supply management unit and a clock signal source may be further disposed in the security protection apparatus 102. The power supply management unit may be coupled to an external power supply (for example, a battery or a power adapter). The power supply management unit may provide electric energy provided by the external power supply to the processor 21, so that the processor 21 can be powered on. An input end of a clock signal management unit is coupled to an external clock source. A clock signal input end of the processor 21 may be coupled to the clock signal management unit. The clock signal management unit may provide, to the processor 21, a clock signal that is input by the external clock source, so that the processor 21 works in a clock cycle provided by the clock signal.

It should be noted that the power supply management unit, the clock signal management unit, the hardware reset unit, the power supply, the clock source, and the like are not controlled by the processor 101, and another hardware circuit controls power-on/off, resetting, entering/exiting a sleep mode, and the like. In this way, power supplies and time sequences of the processor 101 and the security protection apparatus 102 may be separated, and power-on/power-off, resetting, clock cycle modification, and the like of the security protection apparatus 102 are not controlled by a system program operating on the processor 101, to improve security of the security protection apparatus 10. Optionally, the storage device 103 may be integrated into the first semiconductor chip (SOC), or may be integrated into a second semiconductor chip that is in the electronic apparatus 100 and that is different from the first semiconductor chip SOC.

In some embodiments, the electronic apparatus 100 may further include a communication unit 106. As shown in FIG. 1, the communication unit 106 includes but is not limited to a near field communication unit and a mobile communication unit. The near field communication unit exchanges, by operating a short-distance wireless communication protocol, information with a terminal that is located outside a mobile terminal and that is used to access the Internet. The short-distance wireless communication protocol may include but is not limited to:

various protocols supported by a radio frequency identification technology, a Bluetooth communication technology protocol, an infrared communication protocol, and the like. The mobile communication unit accesses the Internet by operating a cellular wireless communication protocol and a radio access network, to implement information exchange between the mobile communication unit and a server that is on the Internet and that supports various applications. The communication unit 106 may be integrated into the foregoing first semiconductor chip. In addition, the electronic apparatus 100 further includes a bus, an input/output port I/O, a storage controller 107, and the like. The storage controller 107 is configured to control the storage device 103. The bus, the input/output port I/O, the storage controller 107, and the like may be integrated in the first semiconductor chip with the security protection apparatus 102, the processor 101, and the like. It should be understood that, in actual application, the electronic apparatus 100 may include more or fewer components than those shown in FIG. 1. This is not limited in embodiments of this application.

Based on a hardware structure of the electronic apparatus 100 shown in FIG. 1, the security protection apparatus 102 provided in some embodiments of this application may perform, when the electronic apparatus 100 is powered on, when the electronic apparatus 100 is woken up, or when the processor 101 operates, security detection on the software operating on the processor 101, so that the electronic apparatus 100 can be protected during power-on and operation. Compared with that in the related technology, the REE or the TEE cannot be better monitored during operation of the REE or the TEE, in some embodiments, sufficient security monitoring can be performed on the REE or the TEE regardless of operating of the REE or the TEE, to reduce a risk that security data such as key data or face image data is stolen or modified, and improve security performance of the electronic apparatus 100.

As shown in FIG. 1, the electronic apparatus 100 may further include a media unit 104, an artificial intelligence (AI) unit 105, and the like. The media unit 104 may further include a dedicated processor such as a graphics processing unit (GPU) or a digital signal processor (DSP). The AI unit 105 may further include a dedicated processor such as a neural-network processing unit (NPU). The security protection apparatus 102 may further perform real-time security protection on software operating on various dedicated processors and related registers included in the media unit 104 and the AI unit 105, stored data, and the like. For security protection performed by the security protection apparatus 102 on other units, refer to a security protection method performed by the security protection apparatus 102 on the software operating on the processor 101 and the related data stored in the processor 101. Details are not described herein again.

The security protection apparatus 102 shown in some embodiments of this application may perform, based on a preset polling period, security protection on software and the like operating on each processor in each electronic apparatus 100. When receiving an external interrupt, the security protection apparatus 102 may further perform, based on an event indicated by the interrupt, security protection on software that executes the event. The following describes, by using embodiments shown in FIG. 5 to FIG. 9, a security protection method applied to the processor 21 in the security protection apparatus 102.

Figure 5:
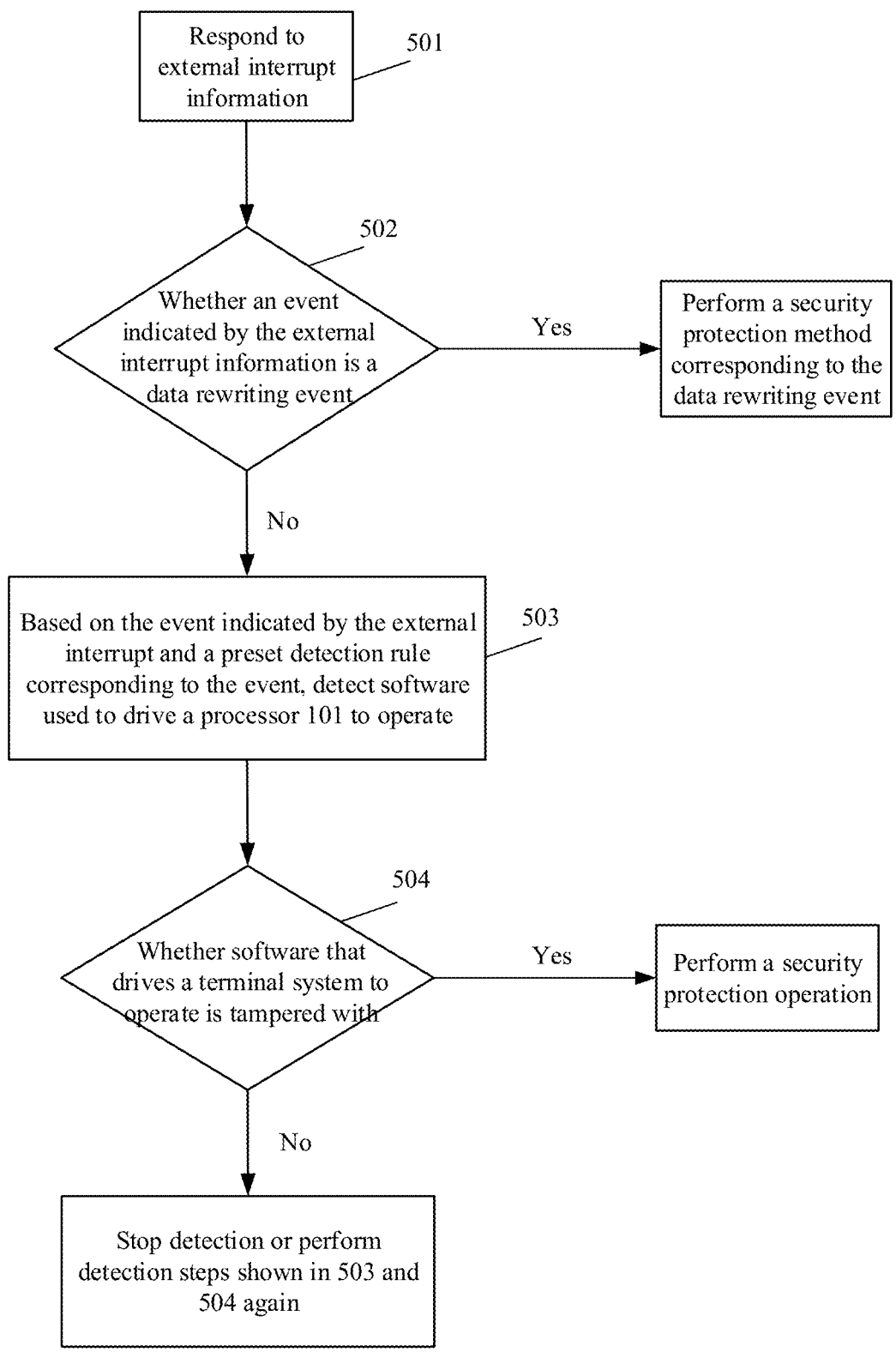
FIG. 5 is a flowchart of a security protection method according to an embodiment of this application.

FIG. 5 is a flowchart of a security protection method. The method is performed by a processor 21, and includes the following steps.

501: Respond to external interrupt information. The external interrupt information herein may be sent by another component that communicates with the processor 21. For example, the external interrupt information may be sent by a processor 101, may be sent by an external power supply, or may be sent by an external input/output device (for example, a keyboard, a mouse, or a display screen). The processor 101 herein may include but is not limited to a CPU, an NPU, a GPU, and the like. The external interrupt information carries identification information, and different identification information indicates different events. The processor 21 may determine, based on the identification information, an event indicated by the external interrupt information. The event indicated by the external interrupt information may include but is not limited to: rewriting variable data by the processor 101, switching an electronic apparatus from a power-off mode to a power-on mode, switching an electronic apparatus from a sleep mode to a wake-up mode, and establishing, by the processor 101, a process to execute an event. The event may include but is not limited to: a face recognition event, a fingerprint recognition event, an unlock event, a payment event, or an event of switching an operating environment of the processor 101 from an REE to a TEE. Specifically, the processor 21 is connected to a power supply management unit of an electronic apparatus 100 or an external power supply. When the power supply management unit or the external power supply starts to supply power, the power supply management unit or the external power supply may send, to the processor 21, information instructing the processor 21 to be powered on. The processor 21 may be further coupled to an external input/output device (for example, a keyboard, a mouse, or a display screen). When a user wakes up the screen by performing an action such as clicking the mouse, tapping the keyboard, or touching the screen, the external input/output device may send to the processor 21 information instructing the processor 21 to switch from the sleep mode to the wake-up mode.

502: Determine whether the event indicated by the external interrupt information is a data rewriting event. In some embodiments, executable code (a system program, an application program, or the like) of software used to drive the electronic apparatus to operate, data or instructions stored in some registers, security data (for example, a startup key, fingerprint data, or face template data), one-time security configuration information (for example, used to configure system resources that may be separately accessed by the processor 101 during operating of the REE and the TEE), or the like cannot be changed in an operating process of the processor 101. This type of program, instruction, or data is usually the same as the corresponding preset information pre-stored in the security protection apparatus 102. Alternatively, a HASH value obtained by performing a HASH operation on this type of program, instruction, or data is the same as the HASH reference value of a corresponding program, a corresponding instruction, or corresponding data pre-stored in the processor 21. Some data may be rewritten in an operating process of the electronic apparatus, for example, data stored in some variable registers, a page table of the electronic apparatus, and some configuration information. This type of data may be different from the corresponding preset information pre-stored in a security protection apparatus 102. Alternatively, a HASH value obtained by performing a HASH operation on this type of data may be different from the pre-stored HASH reference value of the software. Data rewriting is usually implemented by the processor 101 based on an operating instruction sequence.

After the data is rewritten, the corresponding HASH reference value also changes. Therefore, the security protection of the security protection apparatus 102 for the data rewriting event is different from the security protection procedure for another event. After responding to the external interrupt information, the processor 21 may first determine whether the event indicated by the external interrupt information is a data rewriting event. When it is determined that the event indicated by the external interrupt information is a data rewriting event, a related procedure of the security protection method corresponding to the data rewriting event is performed. Step 601 to step 602 show the related procedure of the security protection method corresponding to the data rewriting event. When determining that the event indicated by the external interrupt information is not a data rewriting event, the processor 21 performs step 503.

503: Detect, based on the event indicated by the external interrupt and a preset detection rule corresponding to the event, the software used to drive the processor 101 to operate. The software used to drive the electronic apparatus to operate may include but is not limited to an operating system or an application. The software is, for example, a system program for operating the REE, a system program for operating the TEE, and configuration information of the electronic apparatus. The configuration information is, for example, used to configure a resource that may be accessed by the processor 101 in different software environments. The resource herein may include data (such as audio data, image data, and text data) or an instruction stored in a storage device, and may further include configuration information, an operand, or an instruction stored in a register.

If the events indicated by the external interrupts are different, programs (instructions and data) that drive the electronic apparatus to operate are different, and the corresponding detection rules are also different. The security protection apparatus 102 may pre-store a detection rule corresponding to each event. The detection rule herein may include but is not limited to: a detection cycle (for example, cyclic detection or one-time detection based on a time period set by a timer, where the time period set by the timer may be, for example, 1 ms or 2 ms), to-be-detected content (for example, detecting one or more of a system program, an application program, configuration information, a system list, and security data), and a corresponding security protection operation method when software is tampered with. The to-be-detected content generally includes memory address information and register address information that are used to store a to-be-detected program (an instruction and data). Generally, a plurality of pieces of content (for example, when a face unlock event is executed, four pieces of content need to be detected: a face recognition program (corresponding to physical addresses 0x05xxxx to 0x06xxxx of a RAM), an unlock program (corresponding to physical addresses 0x07xxxx to 0x08xxxx of the RAM), configuration information (corresponding to a register number cl), and security data (corresponding to physical addresses 0x10xxxx to 0x11xxxx of the RAM)) need to be detected for one event. Each piece of content corresponds to one or more pieces of address information. The processor 21 detects each piece of content based on the memory address information and the register address information.

Specifically, the foregoing to-be-detected content may further store a hash reference value corresponding to each piece of content. The processor 21 may control an operator (for example, the hash accelerator 22 shown in FIG. 3) to perform a HASH operation on each piece of content, compare a measured value obtained through the HASH operation with a pre-stored hash reference value of corresponding content, and determine whether the measured value of each piece of content is the same as a corresponding hash reference value, to determine whether the software that drives the processor 101 to operate is being or has been tampered with.

504: Determine, based on a detection result, whether the software that drives the electronic apparatus to operate is tampered with. In some embodiments, when the processor 21 determines, based on a comparison result between the measured value of each piece of content and the corresponding hash reference value, that a measured value of one piece of content is different from a corresponding hash reference value, it indicates that the content is tampered with, that is, the software that drives the electronic apparatus to operate is tampered with. In this case, the electronic apparatus 100 has a security risk. Therefore, the processor 21 may perform a security protection operation on the electronic apparatus 100 based on a security protection operation method corresponding to the event indicated by the external interrupt. The security protection operation performed herein may include but is not limited to: triggering an alarm, resetting the electronic apparatus 100, rejecting a service requested by the software, instructing the processor 101 to stop operating, instructing the processor 101 to stop operating the software, disabling at least a part of functions of the software, or preventing the software from accessing data stored in the electronic apparatus. Specifically, the processor 21 may write a system reset instruction into a reset register having a system reset function. In this case, hardware (for example, the processor 101, a memory, and a register) in the electronic apparatus 100 performs a reset operation driven by the reset instruction. For example, rejecting the service requested by the software may include but is not limited to: rejecting unlocking, rejecting access, rejecting providing a key, a biometric recognition failure, or the like.

When determining, based on the comparison result, that the measured values of all the content are the same as corresponding hash reference values, the processor 21 ends the event detection based on the detection cycle in the foregoing detection rule, or performs detection steps shown in the step 503 to the step 504 until the time period set by the timer ends, to end the event detection.

In some embodiments, the processor 101 rewrites the data based on an instruction sequence for data rewriting. The instruction sequence is registered in advance and does not change when the electronic apparatus is operating. After receiving an external interrupt used to indicate the data rewriting event, the processor 21 may determine, by detecting whether the instruction sequence for performing data rewriting is changed, whether the software operating on the processor 101 is tampered with.

In a possible implementation, a shared memory may be disposed in the memory. Both the processor 21 and the processor 101 may write information into the shared memory, or read information from the shared memory. After the processor 101 rewrites the data, the processor 101 may write the modified part into the shared memory, and send external interrupt information to the processor 21. The external interrupt information herein indicates a location (for example, a point at which a message is sent to the processor 21 after the processor 101 executes 70 instructions and before the processor 101 executes a 71st instruction) in the instruction sequence to which the processor 101 operates, and data rewriting is performed. After receiving the external interrupt message, the processor 21 may determine, based on whether the location in the instruction sequence to which the processor 101 currently executes the instructions is a preset location, whether the instruction sequence executed by the processor 101 is a reference instruction sequence. When it is determined that the instruction sequence executed by the processor 101 is the reference instruction sequence, modification information in the shared memory may be queried, and a corresponding reference value is updated based on the modification information. When the processor 21 determines, based on the external interrupt information sent by the processor 101, that the location in the instruction sequence to which the processor 101 executes the instructions is not the preset location, or the modification information of the modified data is not found in the shared memory, the processor 21 performs the security protection operation on the electronic apparatus 100. The security protection operation herein may be, for example, writing a reset instruction into a reset register having a reset function.

Figure 6:
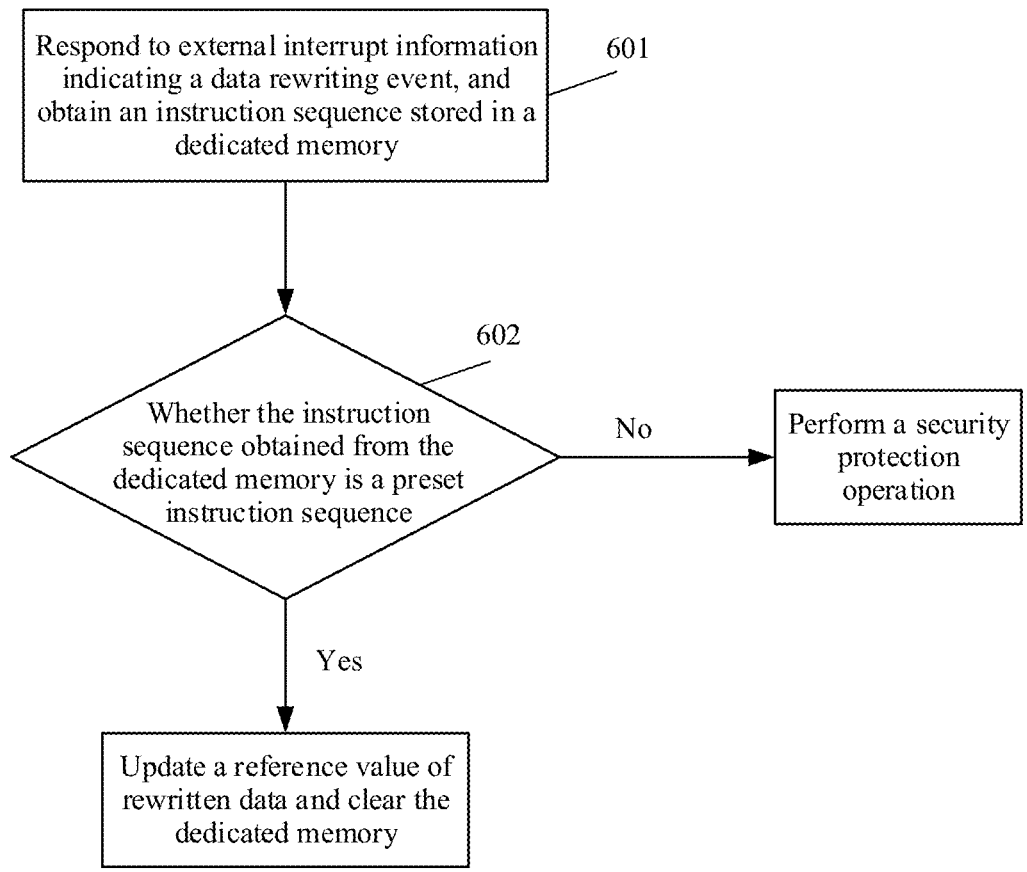
FIG. 6 is another flowchart of a security protection method according to an embodiment of this application.

In another possible implementation, security protection performed on the data rewriting event may be further determined using a method of obtaining an instruction sequence by an on-chip tracking unit. In this implementation, a dedicated memory shown in FIG. 4 is usually disposed in the storage device 103, and the dedicated memory is used by the on-chip tracking unit and the processor 21 to write data or perform an access query. The on-chip tracking unit may be a coresight system. The optional implementation is shown in FIG. 6. Details are as follows:

601: Respond to external interrupt information indicating the data rewriting event, and obtain an instruction sequence stored in the dedicated memory. When rewriting data, the processor 101 triggers the on-chip tracking unit to capture an instruction sequence segment used for rewriting the data and store the instruction sequence segment in the dedicated memory. Then, the processor 101 sends the external interrupt information to the processor 21. In addition to the identification information described in the step 501, the external interrupt information further carries rewritten data and a reference value of the corresponding data. After receiving the external interrupt information in the step 501, the processor 21 determines the event indicated by the external interrupt information. When the event indicated by the external interrupt information is a data rewriting event, the processor 21 may obtain the instruction sequence stored in the dedicated memory.

602: Detect whether the instruction sequence obtained from the dedicated memory is a preset instruction sequence. Specifically, the processor 21 may perform a HASH operation on the obtained instruction sequence. Then, the HASH value obtained through calculation is compared with a pre-stored hash reference value of the instruction sequence used for data rewriting, to determine whether the HASH value and the pre-stored hash reference value are the same. If the HASH value and the pre-stored hash reference value are different, it may be determined that the instruction sequence obtained from the dedicated memory is not the preset instruction sequence, which indicates that the data is, is being, or has been tampered with. In this case, the processor 21 may perform a security protection operation on the electronic apparatus 100, for example, writing a reset instruction into the reset register. If the HASH value and the pre-stored hash reference value are the same, it may be determined that the instruction sequence obtained from the dedicated memory is the preset instruction sequence. In this case, the processor 21 updates a reference value of the rewritten data, so that a comparison is performed by using an updated reference value when data detection is performed next time. In addition, the processor 21 may further clear the instruction sequence stored in the dedicated memory, so that the processor 101 continues to write an instruction sequence into the dedicated memory by using the on-chip tracking unit during data rewriting.

In some optional implementations, before performing the steps shown in FIG. 6, the processor 21 may further detect configuration information of the dedicated memory. The configuration information of the dedicated memory is used to configure which processors or systems can access the dedicated memory, or which processors or systems can write data into the memory. Generally, the configuration information of the dedicated memory is stored in a configuration information register of the processor 21. The processor 21 may find the configuration information of the dedicated memory from the configuration information register, and perform a HASH operation on the configuration information. Then, a HASH value obtained through the HASH operation is compared with a pre-stored HASH reference value of the configuration information of the dedicated memory, to determine whether the HASH value and the pre-stored HASH reference value are the same. When the HASH value and the pre-stored HASH reference value are the same, it is determined that the configuration information of the dedicated memory is not rewritten, that is, the data of the dedicated memory is written by the on-chip tracking unit. When the HASH value and the pre-stored HASH reference value are different, it indicates that the configuration information of the dedicated memory has been changed, and the processor 21 cannot determine whether the data in the dedicated memory is written by the on-chip tracking unit. To ensure data security of the electronic apparatus 100, in this case, the processor 21 may write a reset instruction into the reset register, to reset the electronic apparatus 100.

The following describes in detail the embodiment shown in FIG. 5 by using a specific scenario. In some embodiments, when the external interrupt information instructs to switch from a power-off mode to a power-on mode or instructs to switch from a sleep mode to a wake-up mode, after the processor 21 is powered on or woken up, the processor 21 may periodically detect whether software used to drive the processor 101 to operate is, is being, or has been rewritten. Herein, the detection cycle may be set by using a timer. When detecting that the software used to drive the processor 101 to operate is altered, the processor 21 performs a security protection operation on the electronic apparatus 100. Herein, the software that performs periodic detection through setting of a timer may include but is not limited to: an instruction and data of a system program, configuration information used to perform system configuration, and security data.

Figure 7:
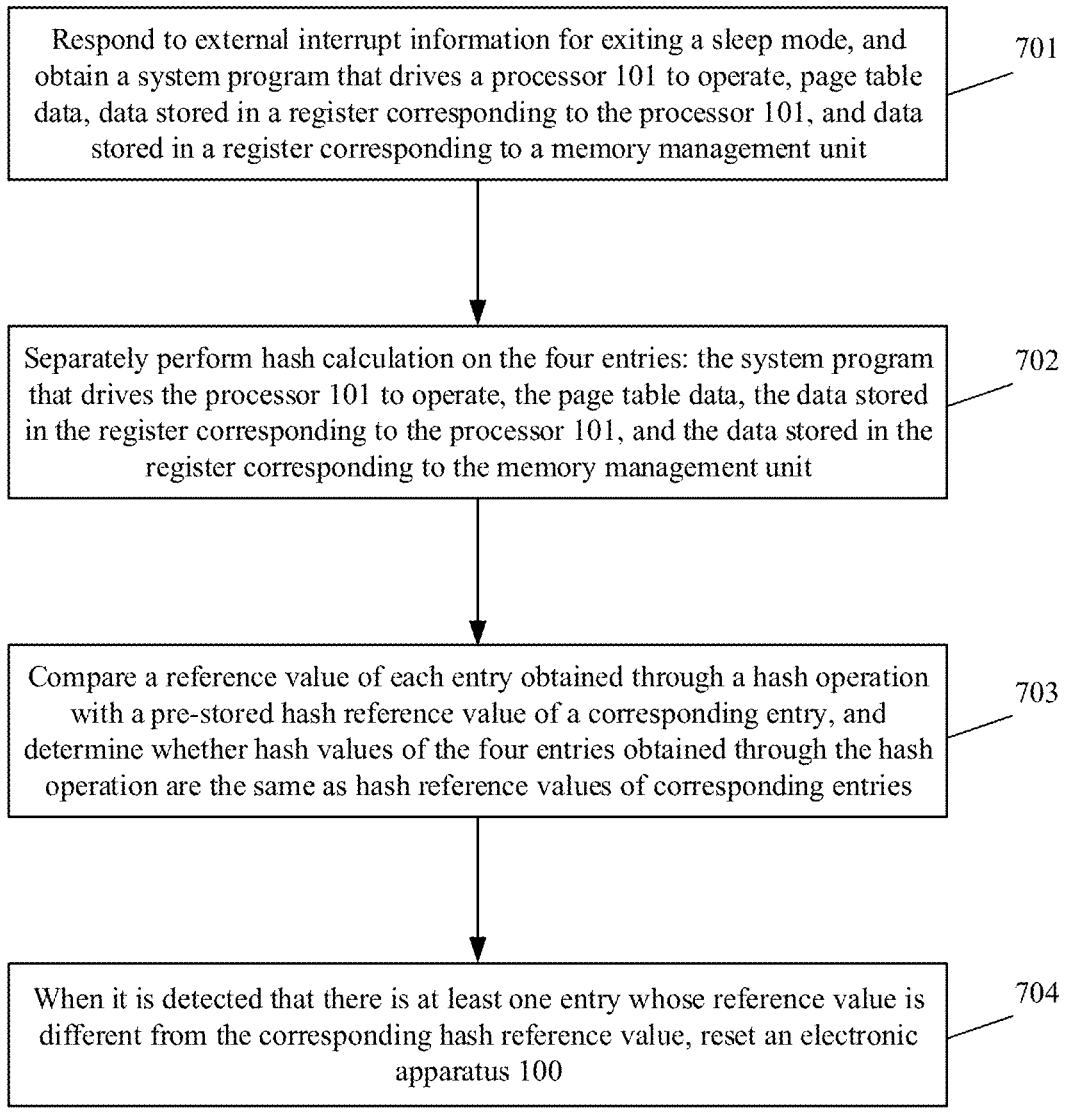
FIG. 7 is a flowchart of an application scenario of a security protection method according to an embodiment of this application.

As shown in FIG. 7, FIG. 7 shows a schematic diagram of detecting, by the processor 21, the software that drives the electronic apparatus to operate when the electronic apparatus exits the sleep mode.

701: The processor 21 responds to external interrupt information for exiting the sleep mode, and obtains a system program (the system program herein includes a mirror system program of each processor, and includes but is not limited to: a program for operating the TEE and a program for operating the REE) that drives the electronic apparatus to operate, page table data, data stored in a register corresponding to the processor 101, and data stored in a register corresponding to a memory management unit.

702: The processor 21 separately performs hash calculation on the four entries: the system program that drives the processor 101 to operate, the page table data, the data stored in the register corresponding to the processor 101, and the data stored in the register corresponding to the memory management unit.

703: The processor 21 compares a reference value of each entry obtained through the hash operation with a pre-stored hash reference value of the corresponding entry, and determines whether the hash values of the four entries obtained through the hash operation are the same as the hash reference values of the corresponding entries.

704: When the processor 21 detects that there is at least one entry whose reference value is different from the corresponding hash reference value, the processor 21 may perform global reset on the electronic apparatus.

Figure 8:
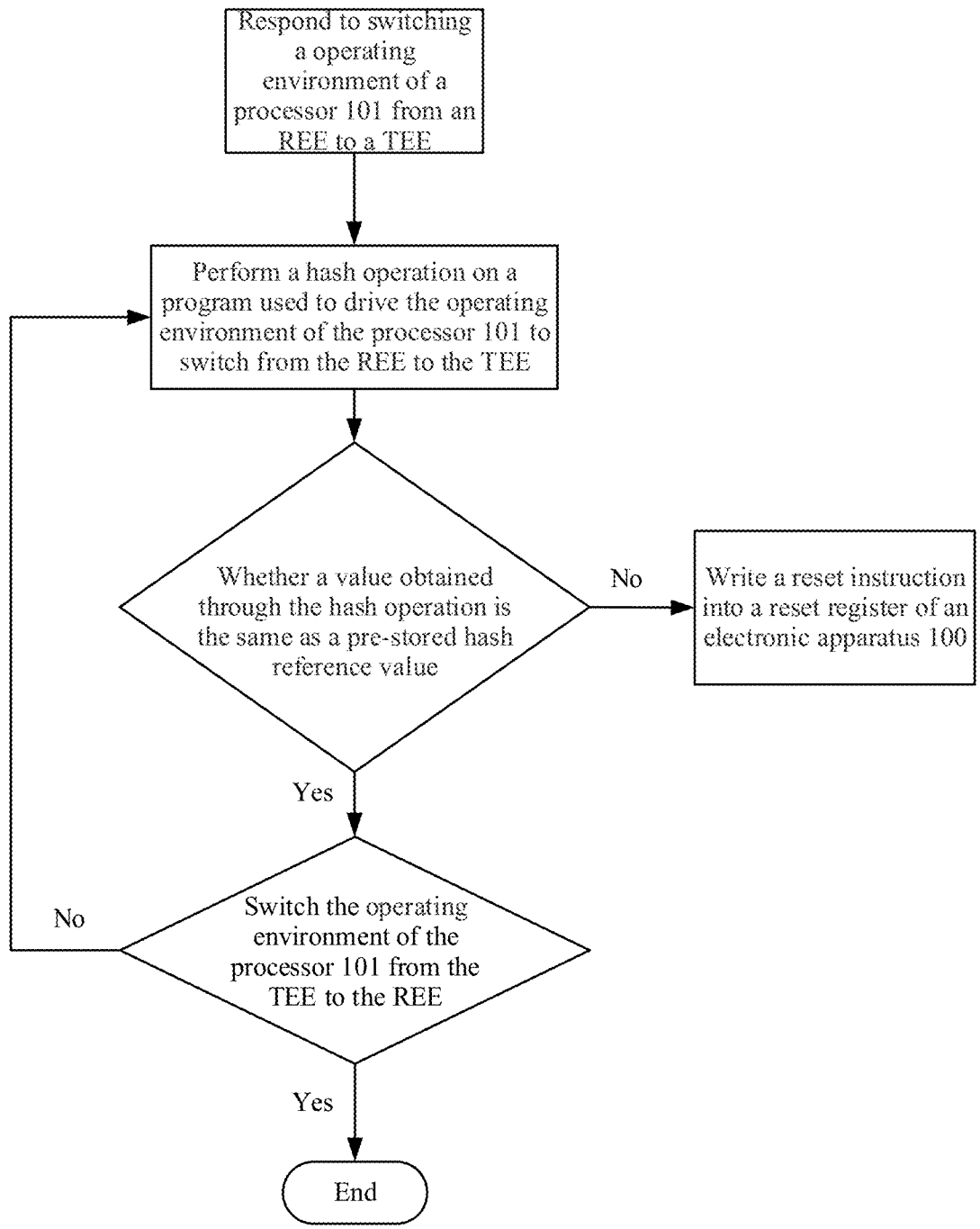
FIG. 8 is a flowchart of another application scenario of a security protection method according to an embodiment of this application.

As shown in FIG. 8, FIG. 8 is a schematic diagram of detecting, by the processor 21, the software operating on the processor 101 when an operating environment of the processor 101 is switched from the REE to the TEE.

It is assumed that a program used to switch the operating environment from the REE to the TEE is stored in a physical address range 0x05xxxx to 0x06xxxx in the storage device 103. When the processor 101 triggers, based on an instruction, the operating environment to switch from the REE to the TEE, the processor 101 sends external interrupt information to the processor 21. The external interrupt information instructs the operating environment of the processor 101 to switch from the REE to the TEE. The processor 21 responds to the external interrupt information, and performs, based on a pre-stored detection rule that corresponds to the case in which the operating environment of the processor 101 is switched from the REE to the TEE, a detection step shown in FIG. 8: performing a hash operation on the program used to drive the operating environment of the processor 101 to switch from the REE to the TEE; comparing a value obtained through the hash operation with a hash reference value corresponding to the program to determine whether the value and the hash reference value are the same; and when the value and the hash reference value are different, writing a reset instruction into the reset register of the electronic apparatus 100, to reset the electronic apparatus 100 based on the reset instruction. In this application scenario, when the value obtained through the hash operation is the same as the hash reference value corresponding to the program, the foregoing detection step continues to be performed until the processor 21 detects that the operating environment of the processor 101 is switched from the TEE to the REE.

Figure 9:
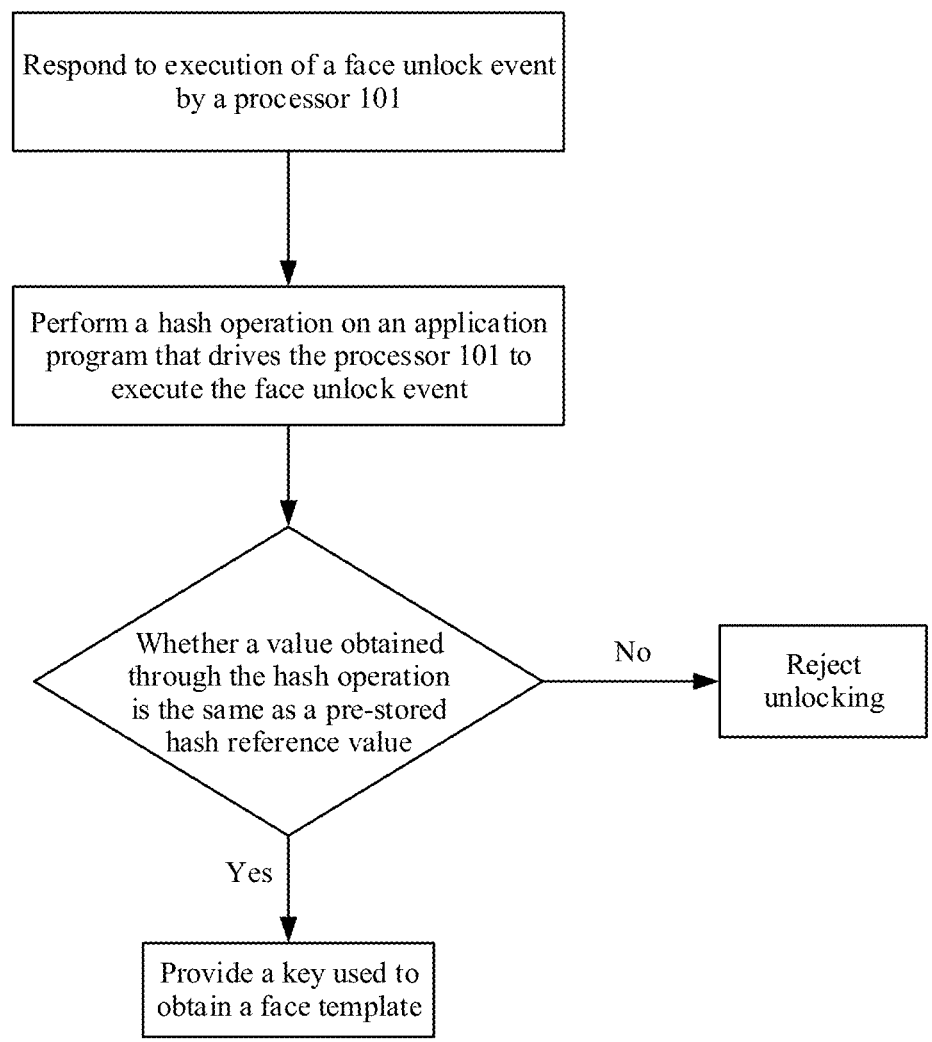
FIG. 9 is a flowchart of a still another application scenario of a security protection method according to an embodiment of this application.

As shown in FIG. 9, FIG. 9 is a schematic diagram of detecting, by the processor 21, the software operating on the processor 101 when the processor 101 executes the face unlock event.

It is assumed that an application program of a face recognition application is stored in a physical address range 0x08xxxx to 0x09xxxx in the storage device 103. When the electronic apparatus triggers operating of the face ID unlock event based on an instruction, the external input/output device (for example, a screen) or the processor 101 sends external interrupt information to the processor 21. The external interrupt information instructs the electronic apparatus to execute the face ID unlock event. The processor 21 responds to the external interrupt information, and performs, based on a pre-stored detection rule corresponding to the face ID unlock event, a detection step shown in FIG. 9: performing a hash operation on an application program that drives the electronic apparatus to execute a face recognition event; comparing a value obtained through the hash operation with a reference value of the application program to determine whether the value and the reference value are the same; and when the value and the reference value are different, rejecting unlocking; or when the value and the reference value are the same, providing a key used to obtain a face template to the processor 101, so that the processor may obtain the face template based on key data for face comparison.

It can be seen from FIG. 8 and FIG. 9 that, based on different events executed by the processor 101, the processor 21 has different detection cycles and different manners of performing the security protection operation on the electronic device 100 after detecting that the application program is tampered with. A targeted processing manner is used based on the event executed by the processor 101, so that detection accuracy can be improved, to ensure secure operation of the electronic apparatus 100.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. An electronic apparatus, wherein the electronic apparatus comprises security protection circuits and a first processor, and security isolation exists between the security protection circuits and the first processor;
   the first processor is configured to operate when driven by software, wherein the software comprises an operating system; and
   the security protection circuits are configured to: perform security detection on the software, and when detecting that the software is tampered with, perform a security protection operation on the electronic apparatus;
   wherein the security protection circuits are further configured to perform periodic security detection on the software based on a time period set by a timer, or perform security detection on the software based on an interrupt event sent by the first processor by:
   controlling a hash accelerator comprised in the security protection circuits to obtain the software and perform a hash operation on the software to obtain a reference value; and
   comparing the reference value with a pre-stored hash reference value, and determine, based on a comparison result, whether the software is tampered with.

2. The electronic apparatus according to claim 1, wherein the security protection operation comprises one or more selected from the following: triggering an alarm, resetting the electronic apparatus, rejecting a service requested by the software, instructing the first processor to stop operating, instructing the first processor to stop operating the software, disabling at least a part of functions of the software, or preventing the software from accessing data stored in the electronic apparatus.

3. The electronic apparatus according to claim 1, wherein the security isolation comprises at least one selected from the following: working system isolation, power supply isolation, or clock signal isolation.

4. The electronic apparatus according to claim 1, wherein the security detection comprises:
   detecting whether at least one of an instruction or data of the software comprises preset information.

5. The electronic apparatus according to claim 1, wherein the first processor comprises an on-chip tracking circuit; and
the on-chip tracking circuit is configured to: when the first processor rewrites data, store an instruction sequence used for data rewriting in a dedicated memory.

6. The electronic apparatus according to claim 5, wherein the security detection comprises: detecting whether the instruction sequence stored in the dedicated memory is a reference instruction sequence.

7. The electronic apparatus according to claim 5, wherein the electronic apparatus comprises a memory, and the memory is configured to store an instruction and data of the software; and
the dedicated memory is a storage space disposed in the memory for use by the on-chip tracking unit and the security protection circuits to perform reading and writing.

8. The electronic apparatus according to claim 1, wherein the security protection circuits further comprise a watchdog circuit, the electronic apparatus further comprises a reset circuit, and the watchdog circuit is coupled to the reset circuit;
the security protection circuits are is-further configured to periodically send a heartbeat instruction to the watchdog circuit; and
the watchdog circuit is configured to: when the heartbeat instruction is not received within a predetermined time period, reset the electronic apparatus by using the reset circuit.

9. The electronic apparatus according to claim 1, wherein the operating system comprises a rich execution environment (REE) and a trusted execution environment (TEE).

10. The electronic apparatus according to claim 9, wherein the security protection circuits are further configured to:
when an operating environment of the first processor is switched from the REE to the TEE, periodically perform the security detection on software that is used to drive the operating environment of the first processor to be switched and software that operates in the TEE; and
stop performing the security detection when the operating environment of the first processor is switched from the TEE to the REE.

11. A security protection method, applied to an electronic apparatus, wherein the method comprises:
operating the electronic apparatus, by a first processor in the electronic apparatus wherein the first processor is driven by software and the software comprises an operating system;
performing, by security protection circuits in the electronic apparatus, security detection on the software, wherein security isolation exists between the security protection circuits and the first processor; and
performing, by the security protection circuits, a security protection operation on the electronic apparatus when detecting that the software is tampered with;
wherein the operating system comprises a rich execution environment (REE) and a trusted execution environment (TEE) and wherein the security protection operation comprises:
when an operating environment of the first processor is switched from the REE to the TEE, periodically performing the security detection on software that is used to drive the operating environment of the first processor to be switched and software that operates in the TEE; and
stopping performing the security detection when the operating environment of the first processor is switched from the TEE to the REE.

12. The security protection method of claim 11, wherein the security isolation comprises at least one selected from the following: working system isolation, power supply isolation, or clock signal isolation.

13. The security protection method of claim 11, wherein the security detection comprises:
detecting whether at least one of an instruction or data of the software comprises preset information.

14. The security protection method of claim 11, wherein the security protection operation comprises one or more selected from the following: triggering an alarm, resetting the electronic apparatus, rejecting a service requested by the software, instructing the first processor to stop operating, instructing the first processor to stop operating the software, disabling at least a part of functions of the software, or preventing the software from accessing data stored in the electronic apparatus.

15. The security protection method of claim 11, wherein the first processor comprises an on-chip tracking circuit, and the on-chip tracking circuit is configured to: when the first processor rewrites data, store an instruction sequence used for data rewriting in a dedicated memory; and
wherein the security detection comprises detecting whether the instruction sequence stored in the dedicated memory is a reference instruction sequence.

16. The security protection method of claim 11, wherein the first processor comprises an on-chip tracking circuit, and the on-chip tracking circuit is configured to: when the first processor rewrites data, store an instruction sequence used for data rewriting in a dedicated memory; and
wherein the electronic apparatus comprises a memory, and the memory is configured to store an instruction and data of the software, and the dedicated memory is a storage space disposed in the memory for used by the on-chip tracking unit and the security protection circuits to perform reading and writing.

17. The security protection method of claim 11, wherein the security protection circuits comprise a second processing circuit, and the second processing circuit is configured to perform periodic security detection on the software based on a time period set by a timer or perform security detection on the software based on an interrupt event sent by the first processor.

* * * * *

UNITED STATES PATENT AND TRADEMARK OFFICE
CERTIFICATE OF CORRECTION

PATENT NO. : 12,223,043 B2
APPLICATION NO. : 17/902220
DATED : February 11, 2025
INVENTOR(S) : Shilin Pan Page 1 of 1

It is certified that error appears in the above-identified patent and that said Letters Patent is hereby corrected as shown below:

In the Claims

In Column 21, Claim 8, Line 24, delete "are is-further" and insert -- are further --, therefor.

Signed and Sealed this
Fifteenth Day of July, 2025

Coke Morgan Stewart
*Acting Director of the United States Patent and Trademark Office*